United States Patent [19]

Eberle

[11] 4,266,597
[45] * May 12, 1981

[54] CAST-ON METHOD AND APPARATUS FOR CASTING PARTS ONTO THE LUGS OF LEAD-ACID BATTERY PLATES STACKS

[75] Inventor: William J. Eberle, Reading, Pa.

[73] Assignee: General Battery Corporation, Reading, Pa.

[*] Notice: The portion of the term of this patent subsequent to Dec. 25, 1995, has been disclaimed.

[21] Appl. No.: 47,001

[22] Filed: Jun. 11, 1979

Related U.S. Application Data

[60] Continuation of Ser. No. 910,944, May 30, 1978, Pat. No. 4,180,120, which is a continuation-in-part of Ser. No. 880,017, Feb. 21, 1978, and a continuation-in-part of Ser. No. 752,644, Dec. 20, 1976, said Ser. No. 880,017, is a division of Ser. No. 659,572, Feb. 19, 1976, Pat. No. 4,085,792, which is a continuation-in-part of Ser. No. 618,772, Oct. 2, 1975, Pat. No. 3,980,126, which is a continuation-in-part of Ser. No. 432,545, Jan. 11, 1974, Pat. No. 3,954,216, which is a continuation-in-part of Ser. No. 395,528, Sep. 10, 1973, Pat. No. 3,861,575, which is a division of Ser. No. 184,338, Sep. 28, 1971, abandoned.

[51] Int. Cl.³ .................. B22D 19/00; B22D 25/04
[52] U.S. Cl. .................. 164/109; 164/112; 164/130; 164/337; 164/333
[58] Field of Search ............... 164/112, 102, 113, 119, 164/133, 142, 143, 284, 303–311, 323–331, 98, 108–110, 136, DIG. 1; 228/223, 224

[56] References Cited

U.S. PATENT DOCUMENTS

| | | | |
|---|---|---|---|
| 1,442,730 | 1/1923 | Oltliger et al. | 164/109 |
| 3,072,984 | 1/1963 | Bronstert | 164/109 |
| 3,448,512 | 6/1969 | Saba | 228/223 |
| 3,547,181 | 12/1970 | Lewis | 164/327 |
| 3,802,488 | 4/1974 | Hull et al. | 164/108 X |
| 3,865,177 | 2/1975 | Akacic et al. | 164/133 |
| 4,180,120 | 12/1979 | Eberle | 164/109 |

FOREIGN PATENT DOCUMENTS

| | | | |
|---|---|---|---|
| 430115 | 6/1926 | Fed. Rep. of Germany | 164/306 |
| 2056243 | 5/1972 | Fed. Rep. of Germany | 164/133 |
| 39-23718 | 10/1964 | Japan | 164/303 |
| 46-33394 | 9/1971 | Japan | 164/113 |
| 49-7301 | 2/1974 | Japan | 164/133 |
| 744238 | 2/1956 | United Kingdom | 164/325 |

*Primary Examiner*—R. L. Spruill
*Assistant Examiner*—K. Y. Lin
*Attorney, Agent, or Firm*—Benasutti Associates, Ltd.

[57] ABSTRACT

A novel "cast-on" method and apparatus are disclosed wherein in the preferred embodiment only one major moving part is provided which is indexed through various positions to cast a group or element from a battery plate stack engaged thereby. In the preferred embodiment, a mold carriage block having a plurality of mold voids formed therethrough slidingly reciprocates along a base plate on which are defined fluxing (loading), casting and part-release positions. In the casting position, lead gravitationally siphons into the mold voids defined in the mold carriage through molten lead supply orifices defined in the base plate along which the carriage slides. Once the casting operation is completed, sliding the carriage out of the casting position effectively seals the molten lead supply orifices. The apparatus and method are particularly suited for use by a single operator who manually loads stacks into the apparatus and subsequently unloads completed groups or elements from the apparatus.

5 Claims, 5 Drawing Figures

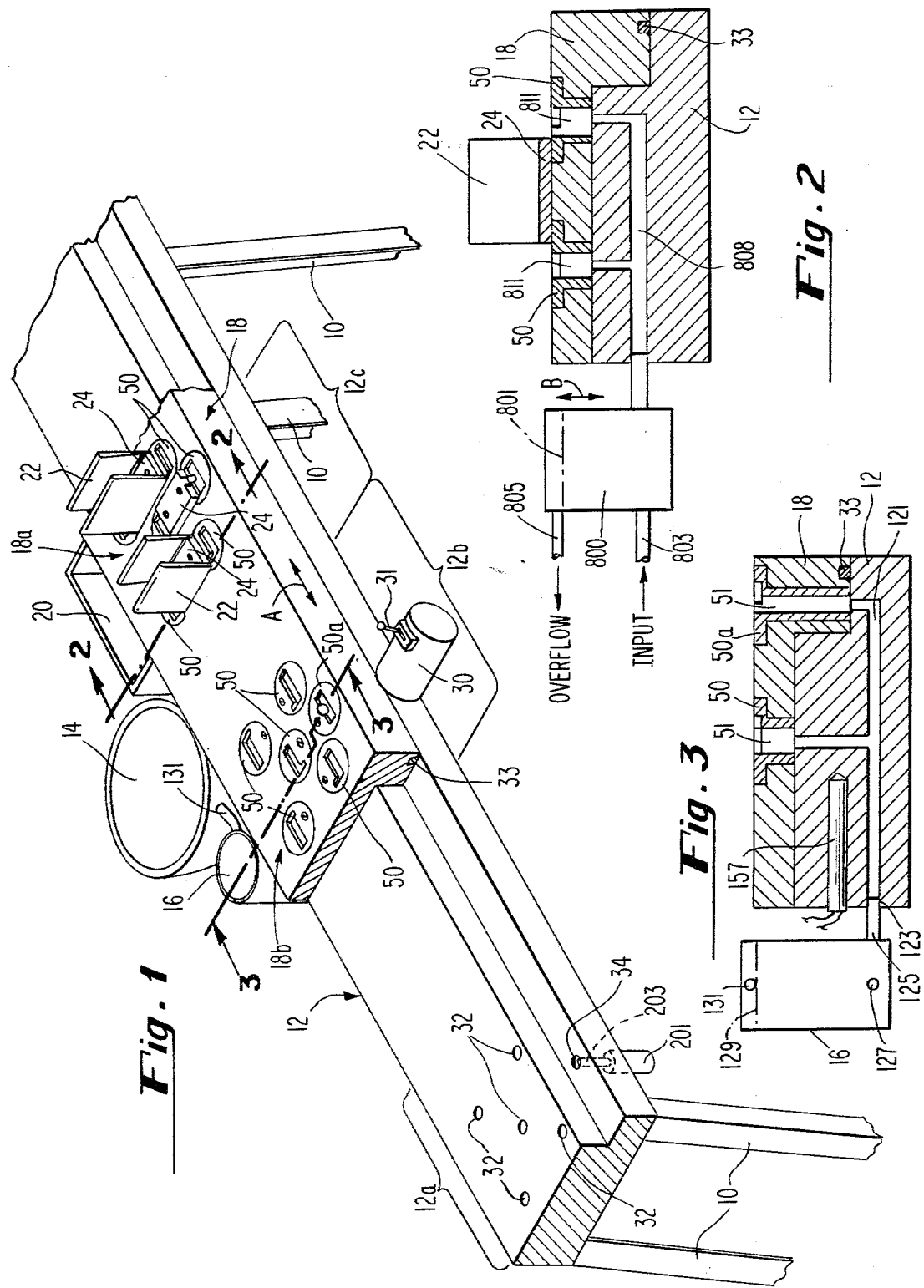

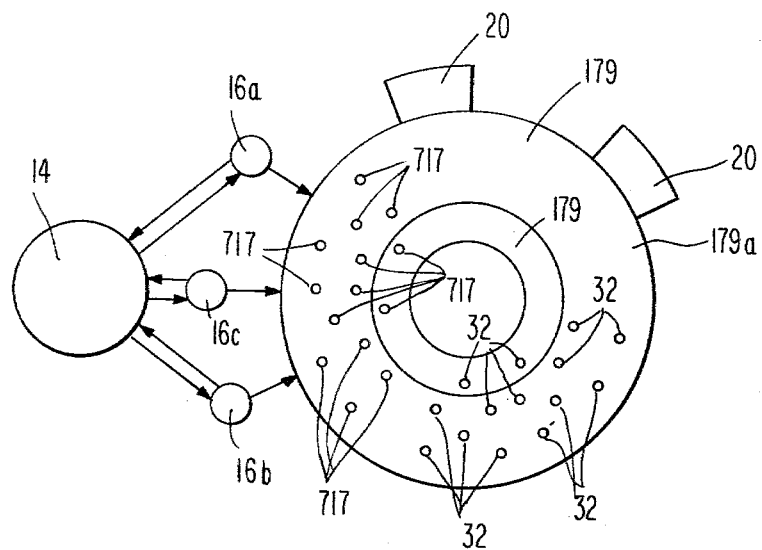
_Fig. 4_
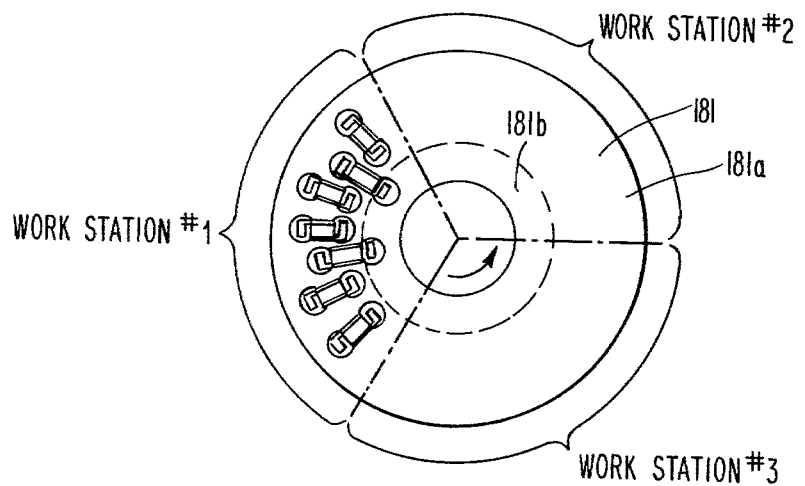
_Fig. 5_

CAST-ON METHOD AND APPARATUS FOR CASTING PARTS ONTO THE LUGS OF LEAD-ACID BATTERY PLATES STACKS

CROSS REFERENCE TO RELATED APPLICATIONS

This application is a continuation of my co-pending application Ser. No. 910,944 filed on May 30, 1978, now U.S. Pat. No. 4,180,120, issued Dec. 25, 1979, entitled "CAST-ON METHOD AND APPARATUS FOR CASTING PARTS ONTO THE LUGS OF LEAD-ACID BATTERY PLATES STACKS".

Application Ser. No. 910,944 is a continuation-in-part of my prior copending patent application Ser. No. 880,017, filed Feb. 21, 1978 entitled "Method Of Casting Lead Alloy Automotive Battery Parts" which application is a divisional of U.S. application Ser. No. 659,572, filed Feb. 19, 1976, now U.S. Pat. No. 4,085,792, dated Apr. 25, 1978 entitled, "Method Of Casting Lead Alloy Automotive Battery Parts" which in turn is a continuation-in-part of U.S. application Ser. No. 618,772, filed Oct. 2, 1975, now U.S. Pat. No. 3,980,126, dated Sept. 14, 1976 entitled, "Automated Post Burn Station" which in turn is a continuation-in-part of U.S. application Ser. No. 432,545, filed Jan. 11, 1974, now U.S. Pat. No. 3,954,216, dated May 4, 1976 entitled, "Apparatus For Thermal Relay Welding" which in turn is a continuation-in-part of U.S. application Ser. No. 395,528, filed Sept. 10, 1973, now U.S. Pat. No. 3,861,575, dated Jan. 21, 1975 entitled, "Apparatus For Thermal Relay Welding" which in turn is a divisional application of U.S. application Ser. No. 184,338, filed Sept. 28, 1971, now abandoned, which applications are specifically incorporated by reference as if fully set forth herein.

Application Ser. No. 910,944 is also a continuation-in-part of my prior copending U.S. application Ser. No. 752,644, filed Dec. 20, 1976 entitled, "Cast In Method Of Producicgn Batteries", which application is incorporated by reference as if fully set forth herein.

BACKGROUND OF THE INVENTION

It has long been a desire to cast the straps, lugs, and/or posts of lead-acid storage battery groups or elements onto battery stacks. Unfortunately, for various reasons the methods and associated apparatus heretofore available to the art have been complex, quite expensive, and difficult to maintain under production conditions. Most prior art cast-on machines have been fully automated, and include elaborate mechanisms for vibrating battery stacks to align the plates and separators within those stacks, gripping those stacks, raising those stacks for indexing to subsequent stations such as lug brushing, fluxing, casting, and unloading stations. While such method have achieved some success, their extreme expense, difficulty of upkeep, and overall complexity have somewhat limited their application in the industry.

For some examples of prior art cast-on machines and methods, please refer to U.S. Pat. Nos. 3,229,339; 3,238,579; 3,200,450; 3,253,306; 3,294,258; and 3,415,220.

SUMMARY OF THE INVENTION

The present invention provides a novel invention for casting the straps, lugs and/or posts of a battery group or element onto a battery stack. In the preferred method, the battery stack is manually grasped, inverted and the lugs of the stack brought into contact with a flux bath or flux saturated sponge in the vicinity of the loading position of the apparatus. The fluxed stacks are then inserted into holders mounted at a work station defined on a reciprocating or rotating mold carriage block such that each of the rows of lugs on the stack extend into appropriately formed molding cavities defined by mold inserts fitted into wells formed through the mold carriage block. Once loaded, the carriage is caused to move so that the mold cavities will align themselves over lead supply orifices defined in a base plate against which the mold carriage slides. Molten lead then gravitationally siphons into the molding cavities to effect the casting process, after which the mold carriage is again moved to separate the castings from the lead within the orifices so that the plates, which now have straps and lugs cast thereon, may then be released from the apparatus and collected by the machine operator. Preferably, two or more work stations are defined on the mold carriage so that while plates are being loaded at one position on the carriage, other plates at an adjacent position may undergo the unloading casting processes. Additional stations may be added on the mold carriage to further simultaneously effect both casting and unloading, and if desired, the base plate and mold carriage may be constructed in mating annular configurations to eliminate any need for reciprocal movement of the carriage with respect to the base plate.

In the preferred embodiment apparatus of the present invention a novel molten lead supply means is provided which includes means for establishing and maintaining a level of lead which serves as the reference level for siphoning lead into molding cavities connected thereto by supply conduits formed in the base plate. In an alternate embodiment, similar means are provided for supplying mold release agents to the molding cavities prior to casting, as will be described more fully hereinafter.

Accordingly, a primary object of the present invention is the provision of a simple, low cost "cast-on" apparatus.

Another object of the present invention is an improved method of casting straps, lugs and/or posts of battery elements onto lead-acid battery plate stacks.

A further object of the present invention is the provision of low cost battery elements or groups made in accordance with the herein described methods and apparatus.

These and other objects of the present invention will become apparent from the following more detailed description.

BRIEF DESCRIPTION OF THE DRAWINGS

FIG. 1 is an isometric view of a preferred embodiment apparatus of the present invention, showing the molding carriage and base plate forshortened, the retaining clips and bridges removed from the molding carriage at the work station located over the casting position and a retaining clip removed from the work station located over the loading position, all for purposes of illustration;

FIG. 2 is a cross-section of an alternate embodiment apparatus of the present invention for applying mold release coating to the mold cavities prior to casting which illustrates these features of this alternate embodiment which would be visible from a cross-section of that embodiment at the position as indicated by the lines and arrows 2—2 in FIG. 1;

FIG. 3 is a cross-section of a portion of the preferred embodiment illustrated in FIG. 1, taken as indicated by the lines and arrows 3—3 in FIG. 1, the lead supply level in the ladle being indicated by a broken horizontal line.

FIG. 4 is a diagramatic top view of a preferred embodiment annular cast-on apparatus of the present invention from which the mold carriage has been removed for illustrative purposes.

FIG. 5 is a diagramatic top view of a mold carriage for use with the embodiment of FIG. 4, the work station details being shown only at work station No. 1.

DETAILED DESCRIPTION OF THE PREFERRED EMBODIMENT

Although specific forms of the invention have been selected for illustration in the drawings, and the following description is drawn in specific terms for the purpose of describing these forms of the invention, this description is not intended to limit the scope of the invention which is defined in the appended claims.

Referring now to the figures, and more particularly to FIG. 1, the preferred embodiment apparatus is isometrically illustrated and may be seen to comprise a substantially elongate base 12 which may be constructed, for example, from meehanite. The base 12 is supported by a plurality of legs 10 and is adapted to receive and slidingly engage a molding carriage designated generally 18 which tracks therealong. The relative position of the mold carriage 18 with respect to the base 12 is established by operation of a reversible hydraulic motor 30 operable by motor switch 31 to cause the mold carriage, through a rack and pinion mechanism, to translate with respect to the base as illustrated by double ended arrow "A" in FIG. 1. Portions of the rack 33 formed in the mold carriage 18 are visible in the drawings. The meehanite base plate 12 has at least three different positions defined therealong, a first part release or unloading position designated generally 12a, a casting position designated generally 12b, and a loading position designated generally 12c. In the preferred embodiment, the mold carriage designated generally 18 has at least two work stations designated generally 18a and 18b defined thereon. Together the base 12 and mold carriage 18 cooperate so that each of the work stations on the mold carriage may slide into positions over at least one loading, one casting and one parts-release position defined along the base. Additionally, the base and mold carriage cooperate so that at least a portion of the mold carriage will at all times be disposed over every casting position defined along the base. It is within the scope of the present invention, accordingly, as illustrated by the foreshortening in FIG. 1 of both the mold carriage and the base of the preferred embodiment apparatus, to have many loading, casting and parts release stations defined along a single base, and to accordingly, have many work stations defined along a mold carriage which slidingly engages same. While the mold carriage and base shown in FIG. 1 are substantially straight, being adapted for reciprocal movement along a linear axis A, it is within the scope of the present invention to configure the preferred embodiment device so that both the base 12 and mold carriage 18 are substantially annular members, as diagramatically illustrated in FIGS. 4 and 5. In this instance, the mold carriage may completely cover the top surfaces of the base at all times, and instead of reciprocating, stacks which are loaded at one work station of the mold carriage may rotate from over the loading position to over the casting position and then to over the parts-release position where furnished groups may then be removed. The work station may then be returned to over the loading position for loading of the subsequent sets of stacks to be processed. In this manner, the top surfaces of the annular base plate are slidingly engaged and covered by undersurfaces of the mold carriage at substantially all times, thereby ensuring that lead supply orifices which open through the top surface of the base at the casting position will be sealed except when those orifices are aligned for introducing molten lead into the mold cavities defined through the mold carriage.

As shown particularly in FIGS. 4 and 5, in this embodiment of the present invention the base and mold carriage are mating annuli. As shown in particular in FIG. 5, the mold carriage may be conveniently defined into a plurality of work stations which are segmented arcs of the mold carriage annulus 181 which correspond to the arcs of the casting, loading and parts-release positions segmented from base annulus 179. In the embodiment shown in FIGS. 4 and 5, the mold carriage 181 is conveniently divided into three work stations, each of said work stations being generally oriented over either the casting, parts-release, or loading positions on the base oriented therebelow. Use of an annular base and annular mold carriage, accordingly, makes it possible to index the mold carriage through a predetermined arc of rotation equal to the arcs of semmetrical work stations and processing positions in order to orient the work stations over the appropriate portion of the base to accomplish the loading, casting or parts-release operations.

Referring again in particular to FIG. 1, the details of preferred embodiment work stations 18a and 18b defined on the mold carriage are illustrated. A plurality of wells or voids are defined through the mold carriage, which wells or voids are configured to mateably receive interchangeable molds 50 which in turn have molding cavities 51 defined therein, the interior surfaces of which define the exterior side surfaces of the parts to be cast. In the preferred embodiment, the mold carriage block 18 and the molds 50 are aluminum, the interior surfaces of the molds being hard surface anodized to impart desirable casting characteristics to the parts cast therein. Work stations 18a and 18b are each fitted to process three battery stacks at once that is, they are fitted with six molds to cast six parts simultaneously, two for each battery stack to be processed. In order to accommodate the casting of parts, such as posts, which are to protrude at different heights above the battery stacks to be processed, the base 12 and mold carriage 18 are each complementally configured to define interface surfaces at various horizontal elavations, depending upon the "depth" of each part to be cast. Referring in particular to work station 18b, a strap which is to have such a post protruding therefrom is cast through mold 50a. This mold 50a which is shown in cross-section in FIG. 3, is seen to extend through a substantially greater thickness of mold carriage 18 prior to terminating at an interface with a complementally formed portion of base 12. In this manner, depending upon the configuration of the sealed, sliding interface defined between the carriage and base, parts of varying depths may be readily cast. Since the remaining parts to be cast are to be of a lesser height relative to the top surface of the battery stack, the remaining molds 50 are disposed through a relatively thinner portion of mold carriage to terminate at a portion of the base-carriage interface which is relatively higher than at the post mold 50a terminus. In order to accurately align and receive the battery stacks to be processed, bridges 24 extend between molds which are used to cast the positive and negative plate straps of a single stack, which bridges 24 protrude generally above the top surface of the mold carriage 18 so that the edges of the plate stack disposed between the lugs will rest against the top surface of the bridge when that stack is inverted over the bridge with the positive and negative rows of plate lugs extending into the mold cavities defined by the positive and negative molds, respectively. These bridges are shown attached to the mold carriage at work station 18a, but these bridges and the retaining clips 22, which will be described hereinafter, have been removed from work station 18b for purposes of better illustrating the interrelationship of the molds 50 with the mold carriage 18. In order to receive and retain battery stacks which are inverted and introduced into contact with the top surfaces of the bridges 24, retaining clips 22 which are opposingly sprung to grip stacks inserted therebetween are also provided to receive and retain each stack in position throughout the casting process.

The operation of the device may, accordingly, be explained as follows: for the device illustrated in FIG. 1, three plate stacks to be processed will be sequentially dipped into flux contained in flux bath 20 in order to prepare the lugs for those stacks for casting. The inverted battery stacks are then introduced between retaining clips 22 so that the edges of the plates and separators of those stacks between their rows of protruding lugs will engage the top surfaces of bridges 24, the bridges and molds 50 having been preselected so that those lugs will protrude an appropriate distance into the mold cavities defined therein, which mold cavities have been selected so that the parts cast therein will be appropriately configured to produce the desired type of group to be cast during this operation. Once loaded, as for example, at work station 18a, the mold carriage may be shifted (to the left in FIG. 1) so that these six mold cavities will communicate with lead supply orifices, one for each part to be cast, appropriately oriented in the base 12 at the molding position 12b so that lead will be introduced through those orifices into the molding cavities to cast the desired parts. These orifices are the terminal portions of lead supply conduits 121, which conduits are defined through the body of base 12. These conduits 121, which are branched within the base to supply each orifice, extend and communicate with a molten lead input 123 which is defined in the base at a point preferably substantially below the lowest point of any part which is to be cast. This input is connected by molten lead supply conduit 125 to a ladle 16 which is constantly charged with a circulating supply of molten lead which is continuously introduced through ladle supply conduit 127 into the ladle at a point substantially below the top surface 129 of the molten lead, which top surface is established by continuously decanting molten lead from the ladle via decantation conduit 131 which extends between the ladle 16 and reservoir 14. Since dross (lead oxides) spontaneously forms when molten lead is exposed to air, but tends to float on the top surface of the lead, this ladle configuration minimizes the chance that lead oxides may be present in that portion of the molten lead which is introduced into the mold cavities. Instead, the dross which might form on the top surface 129 of the lead contained in ladle 16 will be continuously decanted by means of decantation conduit 131 and returned to the main molten lead supply reservoir, 14. Under normal operating conditions, molten lead supply conduit 121 will, of course, be continuously charged with molten lead which is maintained at its casting temperature by providing appropriate cartridge heaters 157 at strategic places within the meehanite base 12. When the molten lead supply orifices are not aligned with mold cavities in which parts are to be cast, these molten lead supply conduits are sealed with respect to the atmosphere by the undersurface of the mold carriage, thereby preventing the formation of "dross". When the molding cavities are aligned over those orifices, and when the level of molten lead in the ladle is at the level 129 (which is automatically established by circulating lead through the ladle 16), lead will naturally siphon into the mold cavities defined within the molds 50 until the level of molten lead within those cavities equals the level of molten lead 129 contained within ladle 16. Since lead is constantly being circulated through the ladle 16 via input conduit 127 and decantation conduit 131, the level 129 of molten lead within the ladle 16 will not drop significantly during this casting process, but rather as the siphoning process takes place, a certain amount of the lead within ladle 16 will flow through conduits 121 into the mold cavities. After an appropriate length of time, the siphoning operation will be complete, whereupon the mold carriage may be again shifted so that the particular work station where casting has taken place need not long be oriented over the orifices of the molten lead supply conduits, and these orifices will be sealed by the undersurfaces of the mold carriage. Further, the shearing action created by movement of the mold carriage with respect to the base will ensure that the lead contained within the orifices or sprues of the molten lead supply conduit will separate from the cast parts, thereby eliminating any subsequent difficulty which might otherwise be encountered by reason of premature solidification of lead within the sprue.

After casting, the work station in which the groups or elements are located is then moved over a parts release or unloading position 12a defined on the base. In the preferred embodiment, release of the cast parts from the mold cavities is facilitated through the use of plurality of cylinders mounted on the undersurface of the base 12, the cylinder rods of which cylinders being journalled within bores 32 and 34 defined in the base 12, so that upon activation of the cylinders these rods will extend above the top surface of the base plate into the mold cavities aligned thereover to cause the separation of the parts cast within those mold cavities from the interior surfaces thereof. In the drawings, ejection cylinder 201 is illustrated with its cylinder rod 203 shown disposed within bore 34 for causing the ejection of the post and strap part which is cast by mold 50a at work station 18b. Since ejection of all parts from the molds at a single work station, or at least for a single group or element, is simultaneous, after release the stack will rise slightly away from the bridge 24 for maintenance in that position by retaining clips 22. These stacks may then be readily grasped by the operator of the device and transferred for use in subsequent assembly operations.

Referring now in particular to FIG. 2, in an alternate embodiment apparatus of the present invention it may be desired to automatically introduce a mold release coating into each of the mold cavities prior to the casting operation. Alternatively, however at the present time less preferred, other liquid compositions, such as flux, may be introduced into the mold cavities prior to casting. In the embodiment illustrated in FIG. 2, the flux tray 20 of the embodiment in FIG. 1 has been repositioned elsewhere in order to make room for a mold release coating ladle 800. As with the molten lead supply ladle, the level 801 of mold release coating may be maintained through the constant circulation of the mold release coating through input conduit 803 and out decantation conduit 805. Unlike the molten lead supply ladle 16, however, the mold release coating ladle 800 is adapted for vertical movement as shown by arrow B in FIG. 2. Ladle 800 is accordingly, mounted for reciprocal movement along the vertical axis B shown in FIG. 2 so that once the mold release coating supply orifices of mold release coating conduits 808 are aligned under mold cavities 811, the mold release coating ladle 800 may be raised and then lowered so that the level of mold release coating introduced into these cavities will rise and then recede so that only that amount of mold release coating which naturally adheres to the interior surfaces of the molds 50 will be retained within the mold cavities 11 during subsequent transfer of those cavities into alignment with the molten lead supply orifices.

Referring now in particular to FIGS. 4 and 5, which illustrate various portions of the above-mentioned annular alternate preferred embodiment of the present invention the substantially annular base 179 is defined into two concentric annular surfaces, 179a and 179b, the interior 179b of which concentric surfaces is disposed substantially lower than the outer surface 179a of the base. In this embodiment, the loading or fluxing position is defined on the base substantially adjacent to flux trays 20 which are mounted against an exterior surface of the base. In this embodiment, each work station is configured to receive and process many more plate stacks than in the embodiment shown in FIG. 1. Accordingly, a molten lead reservoir 14 is diagramatically illustrated for continuously circulating lead through each of a plurality of molten lead ladles 16a, 16b, and 16c, each of which ladles is constructed substantially as shown in FIGS. 1 and 3. These ladles in turn supply molten lead through inputs and conduits within the base 179 to molten lead supply orifices 717 defined in the base. Together, these molten lead supply conduits, molten lead supply orifices, and the portion of the base in the vicinity of same define a casting position on the base.

The remaining third of the annular base comprises a parts-release position similar to the part release position 12a illustrated in FIG. 1. As seen in FIG. 4, a plurality of bores 32 are provided within which are journalled rods of pneumatic cylinders (or a similar actuating assembly disposed under the base), which rods are selectively extendable through the bores to knock out the parts from the mold cavities of a work station aligned thereover.

In FIG. 5, a mold carriage for use with the assembly illustrated in FIG. 4 is shown, the mold carriage 181 being defined into a plurality of work stations, one for each position on the base, which work stations have molds, bridges, and retaining clips fitted thereon similar to those illustrated for work stations 18a and 18b in FIG. 1, the details of these components being illustrated only for work station No. 1. As with the mold carriage 18 illustrated in FIG. 1, the annular mold carriage 181 shown in FIG. 5 is preferably a ring of substantially uniform thickness with the exception of a downwardly projecting, central annular portion of substantially greater thickness, the lower most surface of which mates with annular surface 179b of the base to cooperate therewith to create an interface to facilitate the casting of parts of substantially greater "depths". This embodiment operates in a manner similar to that described in connection with the embodiment of FIGS. 1 and 3, except that each work station may be indexed by rotating the annular mold carriage through a predetermined arc of rotation, as for example, 120° per indexing movement, so that each work station will be oriented sequentially over the loading position, casting position and parts-release or unloading position of the base.

As shown in the drawings, the mold cavities and molten lead supply orifices defined in the base which are intended to supply the same are shown axially aligned with respect to the axis or arc of movement of the mold carriage over the base. Accordingly, for the embodiment shown, depending upon the speed of movement of the mold carriage and the inertial characteristics of the siphoning action of lead into mold cavities temporarily disposed over molten lead supply orifices, it may be advantageous to slightly offset each mold cavity with respect to other mold cavities disposed at the same work station so that upon movement of that mold cavity into its casting position, it will not pass over any other molten lead supply orifice, thereby eliminating any possibility that small amounts of lead could be introduced into the cavity during the indexing procedure.

From the above description it will be seen that an extremely simple machine is provided having a single major moving part which may cast a wide variety of sizes of battery stacks and with a wide variety of strap and lug configurations. Additionally, it will be seen that the present invention provides a novel method of casting molten lead in such a manner that the lead which is actually introduced into the molding voids is gravitationally siphoned up into those voids from a constantly circulating source of molten lead, within which source or ladle the formation of dross is minimized. Unlike prior art devices, the device of the present invention is unusually simple and inexpensive, making it particularly suited for use in producing custom or speciality groups or elements.

It will be understood that various changes in the details, materials and arrangement of parts which have been herein described and illustrated in order to explain the nature of this invention may be made by those skilled in the art within the principle and scope of the invention as expressed in the following claims.

It will further be understood that the "Abstract of the Disclosure" set forth above is intended to provide a non-legal technical statment of the contents of the disclosure in compliance with the Rules of Practice of the United States Patent and Trademark Office, and is not intended to limit the scope of the invention described and claimed herein.

What is claimed is:

1. A method of casting lead parts onto the protruding positive and negative lug rows of a lead-acid battery stack comprising the steps of:
   (a) providing a base surface having at least one molten lead supply orifice disposed in said surface;
   (b) providing a mold carriage means which can be moved along said base surface;

(c) fitting at least one mold into a well defined on said mold carriage means to define at least a mold cavity on said mold carriage means;

(d) positioning said battery stack so at least a portion of one of the rows of said stack protrudes into at least a portion of said at least one mold cavity; and (e) moving said mold carriage means at least between a position wherein said mold cavity is aligned over said at least one orifice to receive molten lead introduced therefrom, and at least one other position wherein portions of said mold carriage means seals said orifice with respect to the atmosphere.

2. The invention of claim 1 wherein step (e) further comprises the sealing of said orifice except when said mold cavity is aligned over said at least one orifice.

3. The invention of claim 2 wherein molten metal is continuously supplied to said orifice from a reservoir having a level which is established and maintained at the level of the top surface of the highest part to be cast.

4. The invention of claim 3 wherein said base surface is provided having portions of said surface disposed at differing elevations, at least two of said portions each having lead supply orifices disposed therein, and wherein said mold carriage means is provided having a plurality of wells defined therethrough spaced in said mold carriage means for selective alignment over said orifices to receive molten lead introduced therefrom.

5. The invention of claim 4 wherein said orifices and said wells are spaced apart by approximately the distance between said positive and negative lug rows of said lead-acid battery stack, and wherein the step of positioning said battery stack further comprises the step of positioning each of the rows of said stack to protrude into at least a portion of each of said mold cavities defined by said wells.

* * * * *